Figure 1:
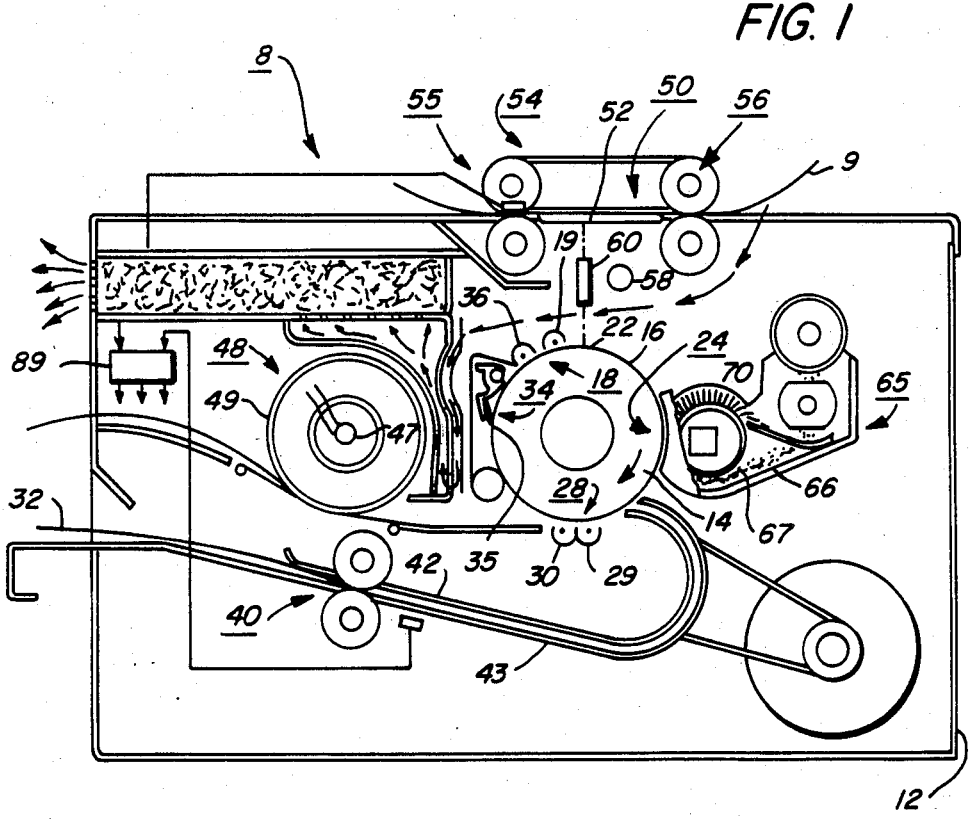

United States Patent [19]

Pease

[11] Patent Number: 4,653,894

[45] Date of Patent: Mar. 31, 1987

[54] FIBER LENS ARRAY MOUNTING IN REPRODUCTION MACHINES

[75] Inventor: Donald L. Pease, Honeoye, N.Y.

[73] Assignee: Xerox Corporation, Stamford, Conn.

[21] Appl. No.: 818,927

[22] Filed: Jan. 15, 1986

[51] Int. Cl.[4] .................. G03B 27/00; G03G 15/04
[52] U.S. Cl. .................................... 355/1; 350/96.1;
350/252; 355/3 R
[58] Field of Search .................. 355/1, 3 R, 8, 55, 67;
350/96.1, 96.24, 252

[56] References Cited

U.S. PATENT DOCUMENTS 4,059,345 11/1977 Kawamura et al. ............. 355/1 X
4,147,412 4/1979 Kawamura et al. ............. 355/1 X
4,353,636 10/1982 Kojima ............................. 355/1

Primary Examiner—Fred L. Braun
Attorney, Agent, or Firm—Frederick E. McMullen

[57] ABSTRACT

A reproduction machine employing a gradient index fiber lens array having a mounting pin adjacent each end of the array body, a flat metallic array support surface in the machine against which the array abuts when in place in the machine, a mounting hole in the array support surface opposite each of the array mounting pins, the array mounting pins fitting snugly into the array mounting holes on assembly of the array with the support surface, and a pair of strip magnets on the side of the array facing the support surface for attracting and holding the array tightly against the support surface.

4 Claims, 2 Drawing Figures

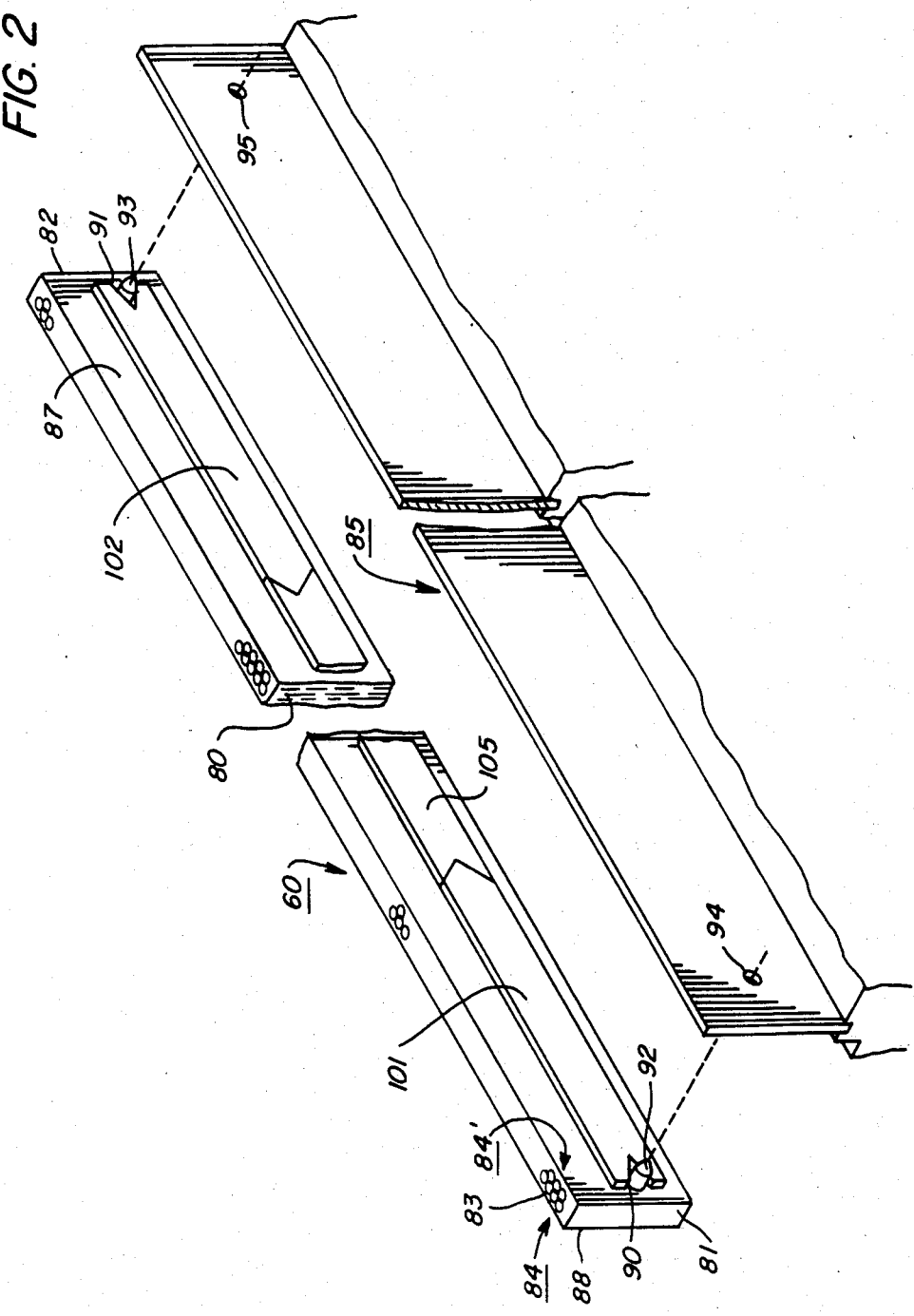

FIBER LENS ARRAY MOUNTING IN REPRODUCTION MACHINES

The invention relates to a reproduction machine employing a lens array, and more particularly, to a relatively simple and inexpensive lens array mounting which facilitates insertion and removal of the lens array while maintaining critical optical alignments.

In reproduction machines, a document to be copied is typically supported on a platen and means provided to effect scanning movement between the document and the machine recording member. The latter may for example comprise the photoreceptor of a xerographic type system. In that type of system, the photoreceptor is first charged in preparation for imaging and thereafter exposed at an exposure station to image rays of the document image. The image rays discharge the previously charged photoreceptor to form a latent electrostatic image of the document on the photoreceptor. The image on the photoreceptor is later developed and the developed image transferred to a copy substrate material such as a copy sheet brought forward in timed relation with the developed image. The copy sheet with the developed image transferred thereto is thereafter fused or fixed while the photoreceptor is cleaned preparatory to charging.

To focus and transmit the image rays to the photoreceptor at the exposure station, an optical system is normally employed. Recently, an array of gradient index fiber lenses or Selfoc lens array has been used for this purpose. Selfoc is a registered Trademark of Nippon Sheet Glass Company, Japan. The lens array, which normally extends the width of the platen is placed between platen and exposure station with the optical axis of the lens array coincident with the axis between the scanning point on the platen and the exposure station.

However, because of the incidence of dirt, dust, etc. in and about the machine, it is often necessary to clean or wipe the lens array. While cleaning can sometimes be done with the lens array in place in the machine, for best results it is usually necessary to remove the array. However, this is often a difficult chore requiring a trained technician or operator and special tools. And since the optical alignment of the lens array is critical to successful operation of the machine, re-inserting the lens array is difficult and time consuming if the lens array is to be accurately aligned and damage or scratching of the array avoided.

To alleviate this problem and provide a lens array mounting that is simple and inexpensive yet at the same time allows ready removal and installation of a lens array in a reproduction machine with assured optical alignment, the present invention provide, in a reproduction machine having a lens array for transmitting image rays of the document lines scanned along an optical path to a photoreceptor to expose the photoreceptor and create a latent electrostatic image of the document, the lens array having a generally rectangular body with at least one substantially planar side and a plurality of lenses arranged in at least one row, the row of lenses being substantially parallel with the scan line; the combination of: at least two discrete lens aligning points on the array body for use in locating the lens array in the machine and aligning the lens array in the optical path; a substantially planar lens support and locating surface in the machine between the scan station and the photoreceptor, the lens support surface being in a plane substantially parallel to but offset from the scan line; a locating point on the lens support surface for each of the lens aligning points on the array body, the lens aligning points on the array body and the locating points on the lens support surface interengaging with one another on bringing the array body into side by side abutting relation with the lens support surface to locate and align the lens array in the machine; and magnetic means for releasably securing the array body tightly against the lens support surface.

IN THE DRAWINGS

FIG. 1 is a side view in section of a reproduction machine having the improved lens array mounting of the present invention; and FIG. 2 is an isometric view showing details of the lens array mounting of the present invention.

Referring to FIG. 1 of the drawings, there is shown a xerographic type reproduction machine 8 incorporating the present invention. Machine 8 has a suitable frame 12 on which the machine xerographic components are operatively supported.

Briefly, and as will be familiar to those skilled in the art, the machine xerographic components include a recording member, shown here in the form of a rotatable photoreceptor 14. In the exemplary arrangement shown, photoreceptor 14 comprises a drum having a photoconductive surface 16. Other photoreceptor types such as belt, web, etc. may instead be contemplated. Operatively disposed about the periphery of photoreceptor 14 are charge station 18 with charge corotron 19 for placing a uniform charge on the photoconductive surface 16 of photoreceptor 14, exposure station 22 where the previously charged photoconductive surface 16 is exposed to image rays of the document 9 being copied or reproduced, development station 24 where the latent electrostatic image created on photoconductive surface 16 is developed by toner, transfer station 28 with transfer corotrons 29, 30 for transferring the developed image to a suitable copy substrate material such as a copy sheet 32 brought forward in timed relation with the developed image on photoconductive surface 16, and cleaning station 34 with cleaning blade 35 and discharge corotron 36 for removing leftover developer from photoconductive surface 16 and neutralizing residual charges thereon.

Copy sheets 32 are brought forward to transfer station 28 by feed roll pair 40, sheet guides 42, 43 serving to guide the sheet through an approximately 180 turn prior to transfer station 28. Following transfer, the sheet 28 is carried forward to a fusing station 48 where the toner image is fixed by fusing roll 49. Fusing roll 49 is heated by a suitable heater such as lamp 47 disposed within the interior of roll 49. After fixing, the copy sheet 32 is discharged.

A transparent platen 50 supports the document 9 as the document is moved past a scan point 52 by a constant velocity type transport 54. As will be understood, scan point 52 is in effect a scan line extending across the width of platen 50 at a desired point along platen 50 where the document is scanned line by line as the document is moved along platen 50 by transport 54. Transport 54 has input and output document feed roll pairs 55, 56 respectively on each side of scan point 52 for moving document 9 across platen 50 at a predetermined speed. Exposure lamp 58 is provided to illuminate a strip-like area of platen 50 at scan point 52. The image rays from the document line scanned are transmitted by a gradient index fiber lens array 60 to exposure station 22 to expose the photoconductive surface 16 of the moving photoreceptor 14.

Developing station 24 includes a developer housing 65, the lower part of which forms a sump 66 for holding a quantity of developer 67. As will be understood by those skilled in the art, developer 67 comprises a mixture of larger carrier particles and smaller toner or ink particles. A rotatable magnetic brush developer roll 70 is disposed in predetermined operative relation to the photoconductive surface 16 in developer housing 65, roll 70 serving to bring developer from sump 66 into developing relation with photoreceptor 14 to develop the latent electrostatic images formed on the photoconductive surface 16.

Referring particularly to FIG. 2, lens array 60 has an elongated generally rectangular body 80 with flat sides 87, 88 and a plurality of fiber lens elements 83 arranged in two linear arrays or rows 84, 84' extending from a point adjacent one end 81 of the array body 80 to a point adjacent the opposite end 82. The individual lens elements 83 of each row 84, 84' are staggered or offset with respect to one another with the effective length of rows 84, 84' being substantially equal to or slightly greater than the largest document to be copied. While two rows 84, 84' of fiber lens elements 83 are shown, a single row of lens elements may be contemplated. Alternately, the number of rows of lens elements may be greater than two and in any multiple row arrangement, the lens elements may be aligned or staggered with respect to one another.

As will be understood, lens array 60 is mounted in machine 8 in alignment with the optical axis between scan point 52 on platen 50 and exposure station 22 to assure that the individual fiber lens elements 83 focus and transmit images of the entire area of the document line at scan point 52 to the photoconductive surface 16 without image loss or distortion.

To support lens array 60 in machine 8 while at the same time accurately establishing and maintaining critical optical alignment of the lens array 60, frame 12 of machine 8 includes a fixed array support or locating surface 85 between platen 50 and exposure station 22. Support surface 85, which is substantially flat or planar, is in a substantially vertical plane parallel to the longitudinal axis of scan point 52 but offset slightly therefrom to accommodate the thickness of the array body 81 and the array attaching means as will appear.

As will be understood by those familiar with gradient index fiber lens arrays, during manufacture of the lens array, there is typically provided a pair of locating holes 90, 91 adjacent each end 81,82 of the array member 81. Locating holes 90,91 serve as points of reference during manufacture of the lens array and hence provide extremely accurate reference points for installing and locating the lens array during subsequent use.

A pair of array mounting pins 92, 93 are inserted into holes 90, 91 respectively of the array body 80 and secured. Pins 92, 93 project outwardly from side 87 of the array body 80. A pair of mounting holes 94, 95 are provided in support surface 85 for mating engagement with mounting pins 92, 93 respectively on the array body 80. The position, size, and shape of array mounting holes 94, 95 are chosen to assure that pins 92, 93 on the array body 80 tightly and snugly fit within mounting holes 94, 95 respectively in support surface 85 on assembly of array member 80 with support surface 85.

To attach and hold the array body 80 tightly against support surface 85 along the length thereof with mounting pins 92, 93 in mounting holes 94, 95 respectively, a pair of strip magnets 101, 102 are provided on side 87 of the array body 80 opposite support surface 85 adjacent each end 81, 82 of member 80. Strip magnets 101, 102 may be attached to side 87 of array member 80 by any suitable means, as for example by adhesive. Strip magnets 101, 102 have an axial length chosen to provide the requisite degree of magnetic force necessary to attract and hold the array body 80 tightly and securely against support surface 85 while permitting lens array 60 to be readily and easily removed and replaced while maintaining optical alignment of the array fiber lens elements 83 with the machine optical axis. To provide support and prevent bending or arching of the array body in the area between strip magnets 101, 102 and additionally absorb vibrations, a strip of relatively rigid foam material 105 is fastened to side 87 of array member 80 between strip magnets 101, 102. The compressed thickness of foam material 105, which may be fastened to side 87 of array member 80 by any suitable means such as adhesive, is substantially the same as that of strip magnets 101, 102.

While a pair of strip magnets 101, 102 are shown, a single strip magnet extending the length of the array body may instead by used. Alternately, a succession of smaller strip magnets may be attached in spaced relation to one another on side 87 of array body 80 with or without strips of foam material therebetween. And while the intermediate strip 105 is described as being composed of a suitable foam material, other relatively rigid non-magnetic materials may instead be contemplated.

While mounting pins 92, 93 and mounting holes 94, 95 are shown and described as being on the array body 80 and machine support surface 85 respectively, the position may be reversed with pins 92, 93 mounted on and projecting from support surface 85. In that event, locating holes 90, 91 in the array body 80 would normally be used as mounting holes for the receipt of mounting pins 92, 93 respectively. Additional mounting holes and pin pairs may also be envisioned.

While the invention has been described with reference to the structure disclosed, it is not confined to the details set forth, but is intended to cover such modifications or changes as may come within the scope of the following claims.

I claim:

1. In a reproduction machine having a movable photoreceptor on which a latent electrostatic image of the document being reproduced is generated, means for developing the latent image on said photoreceptor, transfer means for transferring the developed image from said photoreceptor to a copy substrate material, a scan station providing a scan line where the document is scanned line by line, and means for establishing relative movement between said document and said scan line, the combination of:

(a) a lens array for transmitting image rays of the document lines scanned along an optical path to said photoreceptor to expose said photoreceptor and create said latent electrostatic image of the document, said lens array having a generally rectangular body with at least one substantially planar side and a plurality of lenses arranged in at least one row, said row of lenses being substantially parallel with said scan line;

(b) said array body having at least two discrete lens aligning points for use in locating said lens array in said machine and aligning said lens array in said optical path;
(c) a substantially planar lens support and locating surface in said machine between said scan station and said photoreceptor, said lens support surface being in a plane substantially parallel to but offset from said scan line;
(d) a locating point on said lens support surface for each of said lens aligning points on said array body, said lens aligning points on said array body and said locating points on said lens support surface interengaging with one another on bringing of said one side of said array body into abutting relation with said lens support surface to locate and align said lens array in said machine; and
(e) magnetic means for releasably securing said one side of array body tightly against said lens support surface.

2. The machine according to claim 1 in which said magnetic means comprises at least one strip of magnetic material secured to said one side of said array body.

3. The machine according to claim 1 in which said magnetic means comprises a first strip of magnetic material secured to said one side of said array body adjacent one end of said array body, a second strip of magnetic material secured to said one side of said array body adjacent the opposite end of said array body, the combined length of said first and second strips of magnetic material being less than the width of said array body, and
a strip of resilient material secured to said one side of said array body between said first and second strips of magnetic material whereby said first and second strips of magnetic material and said strip of resilient material cooperate to form a composite strip extending from a point adjacent said one end of said one side of said array body to a point adjacent said other end.

4. The machine according to claim 1 in which
(a) said lens aligning points each comprise a locating hole in said array body adjacent each end,
(b) said locating points each comprising a projecting pin on said lens support surface insertable into said locating holes on bringing of said one side of said array body into abutment with said reference surface, the exterior dimension and configuration of said pins being complementary with the interior dimension and configuration of said locating holes to provide a tight fit between said locating holes and said pins whereby to accurately and tightly locate said lens array in said machine without slippage and lost motion.

* * * * *